US009317774B2

(12) United States Patent
Villien (10) Patent No.: US 9,317,774 B2
(45) Date of Patent: Apr. 19, 2016

(54) METHOD FOR LOCATING AN OBJECT USING A REFERENCE GRID

(75) Inventor: Christophe Villien, Seyssinet Pariset (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 15 days.

(21) Appl. No.: 14/238,610

(22) PCT Filed: Aug. 22, 2012

(86) PCT No.: PCT/EP2012/066332
§ 371 (c)(1),
(2), (4) Date: Feb. 12, 2014

(87) PCT Pub. No.: WO2013/026872
PCT Pub. Date: Feb. 28, 2013

(65) Prior Publication Data
US 2014/0211998 A1    Jul. 31, 2014

(30) Foreign Application Priority Data
Aug. 24, 2011  (FR) ...................................... 11 57487

(51) Int. Cl.
 *G06K 9/00* (2006.01)
 *G06K 9/62* (2006.01)
 *G05D 1/02* (2006.01)
 *G01C 21/12* (2006.01)

(52) U.S. Cl.
 CPC ................ *G06K 9/62* (2013.01); *G05D 1/0234* (2013.01); *G01C 21/12* (2013.01); *G05D 1/027* (2013.01); *G05D 2201/0216* (2013.01); *Y10S 901/01* (2013.01)

(58) Field of Classification Search
 None
 See application file for complete search history.

(56) References Cited

U.S. PATENT DOCUMENTS 3,935,922 A * 2/1976 Cooper et al. ................. 180/168
3,970,840 A * 7/1976 De Bruine .................... 250/202
(Continued)

FOREIGN PATENT DOCUMENTS

| KR | 10 2011 0010422 | 2/2011 |
| WO | 99 59112 | 11/1999 |

OTHER PUBLICATIONS

Machler, Philip, "Robot Odometry Correction Using Grid Lines on the Floor", Feb. 1997.*
(Continued)

*Primary Examiner* — Aaron W Carter
(74) *Attorney, Agent, or Firm* — Oblon, McClelland, Maier & Neustadt, L.L.P.

(57) ABSTRACT

A method for locating an object by a reference grid, the object moving in a plane parallel to or identical to that of the grid. When crossing of a line of the grid is detected by the object, its heading is determined and, as a function of the detection, probabilities of the thus crossed line being a horizontal line and a vertical line respectively are obtained. Displacement of the object is assessed from the probabilities obtained and a horizontal and vertical pitch of the grid. A position of the object is then updated from a position of the object determined during a last line crossing of the grid and the displacement thus assessed.

15 Claims, 4 Drawing Sheets

(56) References Cited

U.S. PATENT DOCUMENTS

| | | | |
|---|---|---|---|
| 2004/0013295 A1* | 1/2004 | Sabe | G06T 7/0022 382/153 |
| 2004/0217166 A1* | 11/2004 | Myers et al. | 235/383 |
| 2005/0187678 A1* | 8/2005 | Myeong | G05D 1/0255 701/27 |
| 2007/0282484 A1* | 12/2007 | Chung | G05D 1/0214 700/245 |
| 2008/0193009 A1* | 8/2008 | Sonoura | 382/153 |
| 2009/0024250 A1* | 1/2009 | Oaki et al. | 700/245 |
| 2013/0131984 A1* | 5/2013 | Elgersma et al. | 701/514 |
| 2014/0211998 A1* | 7/2014 | Villien | 382/103 |

OTHER PUBLICATIONS

Machler, Philip, "Robot Positioning by Supervised and Unsupervised Odometry Correction", Thesis, Full Version, 1998.*

Mächler, P., "Robot Positioning by Supervised and Unsupervised Odometry Correction", PHD Thesis, URL: http://www.cs.cmu.edu/~biorobotics/papers/sbp_papers/integrated2/machler_odometry.pdf, Total 82 Pages, (1998) XP 002677238.

International Search Report Issued Dec. 18, 2012 in PCT/EP12/066332 Filed Aug. 22, 2012.

\* cited by examiner

METHOD FOR LOCATING AN OBJECT USING A REFERENCE GRID

TECHNICAL FIELD

The present invention generally relates to the field of location and more particularly that of locating inside buildings (so-called indoor location). The locating method according to the invention is applicable in particular to locating supermarket trolleys.

STATE OR PRIOR ART

Indoor location is a specific research field because of the absence of satellite radiolocation signals inside buildings. Numerous original solutions have been proposed in the literature and some of them give rise to actual devices.

Among the proposed solutions, one can recite in particular those resorting to power measurements of Wi-Fi access points, those resorting to UWB (Ultra Wide Band) transmitters or even those resorting to inertial techniques.

Indoor location from Wi-Fi access points implies a sufficient actual density of such access points, a condition which is not always fulfilled in practice. It also suffers from an insufficient accuracy.

UWB radiolocation techniques, with or without satellite hybridization, are relatively expensive since they require resorting to specific transmitters.

The location using inertial systems (for example using MEMS gyroscopes) is liable to quick drifts over time and consequently requires frequent resettings.

A method for locating a supermarket trolley was proposed in the application WO-A-9959112. The trolley is equipped with a RFID tag which can be detected by detector matrices provided in the ground. This locating method however implies a very heavy infrastructure.

A method for locating a robot was proposed in Patent application KR-A-20110010422. The robot is equipped with an upwardly directed camera filming the ceiling while the robot moves. The ceiling is provided with a bidimensional arrangement of orthogonal lines forming a grid. This grid consists of so-called horizontal lines, spaced apart by a distance $L_x$, and so-called vertical lines, spaced apart by a distance $L_y$. The distances $L_x$ and $L_y$ are assumed to be known.

Images captured by the camera are processed in real time and the position of the robot is determined as a function of the line crossing of the grid. More precisely, each time the image centre crosses a line of the grid, the robot coordinates are updated as follows:

$$x_i = x_{i-1} + k_x L_x$$
$$y_i = y_{i-1} + k_y L_y \quad (1)$$

where $(x_i, y_i)$ are the robot coordinates in a horizontal plane during the $i^{th}$ line crossing, and $k_x$, $k_y$ assume their values among the triplet $\{-1, 0, 1\}$ as explained later. It is assumed that the coordinates are defined with respect to an origin O in the horizontal plane and that the horizontal (resp. vertical) lines of the ceiling are parallel to the axis Ox (resp. Oy).

Figure 1:
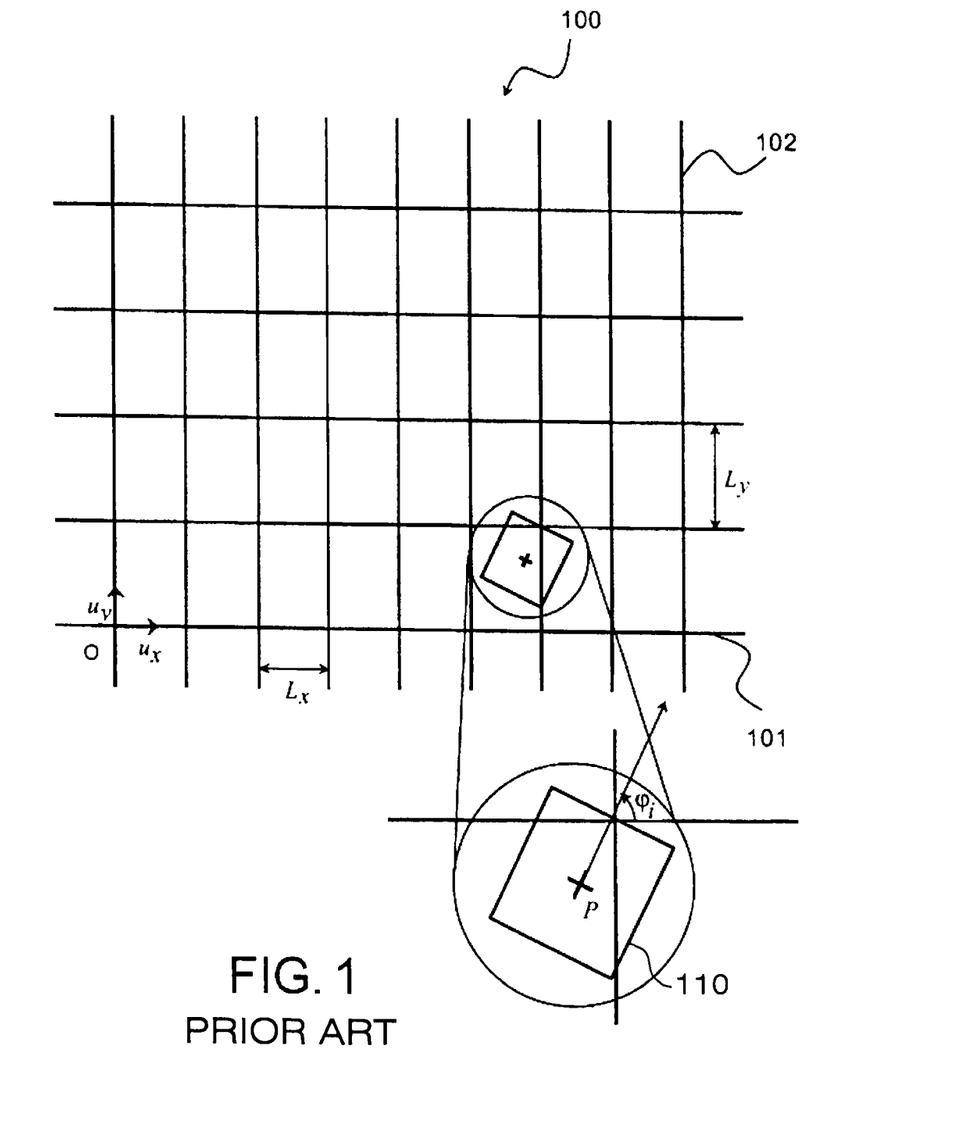
FIG. 1 represents the principle of a locating method using a reference grid known from prior art.

The values of $k_x$, $k_y$ are defined as follows:
- $k_x=1$ (resp. $k_y=1$) if the image centre crosses a horizontal line (resp. a vertical line) in the increasing x (resp. y) direction;
- $k_x=0$ (resp. $k_y=0$) if the image centre does not cross a horizontal line (resp. a vertical line);
- $k_x=-1$ (resp. $k_y=-1$) if the image centre crosses a horizontal line (resp. a vertical line) in the decreasing x (resp. y) direction;

FIG. 1 represents the principle of the locating method described in the aforesaid patent application.

The image captured by the camera is represented by a solid square 110, superimposed with the reference grid 100. The grid consists of horizontal lines 101 and vertical lines 102.

The image centre, indicated by the point P, conventionally defines the current position of the robot. $\alpha_i$ represents the angle between the direction of the robot movement and the (horizontal or vertical) line crossed by the point P during the $i^{th}$ crossing. If $\phi_i$ represents the robot course with respect to the axis Ox, the latter can be determined from the angle $\alpha_i$ according to the different possible crossing situations:

a) $k_x=1$ and $k_y=0$, that is if the point P crosses a horizontal line in the increasing x direction: $\phi_i=\alpha_i$;
b) $k_x=-1$ and $k_y=0$, that is if the point P crosses a horizontal line in the increasing x direction: $\phi_i=-\alpha_i$;
c) $k_x=0$ and $k_y=1$, that is if the point P crosses a vertical line in the increasing y direction: $\phi_i=\pi/2-\alpha_i$;
d) $k_x=0$ and $k_y=-1$, that is if the point P crosses a vertical line in the decreasing y direction: $\phi_i=3\pi/2-\alpha_i$.

At each line crossing, the robot selects from hypotheses (a) to (d), the one that minimizes the variation in orientation between two successive crossings, in other words the angular deviation $|\phi_i - \phi_{i-1}|$. The values of $k_x$, $k_y$ corresponding to this minimum are deduced and the coordinates of the robot are updated by means of the expression (1).

This locating method however has a number of drawbacks. First, it requires an expensive equipment and complex image processings. Then, and above all, it can lead to disastrous results in case of a quick turn (rotation by more than 90°) or even a reverse movement of the robot. Indeed, in this case, the condition of minimizing the angular deviation $|\phi_i - \phi_{i-1}|$ between two successive crossings is not relevant. Given that it is not possible to distinguish a crossing of a horizontal line from a crossing of a vertical line, the entire subsequent trajectory is affected by an error of at least 90°.

The object of the present invention is consequently to provide a locating method by means of a reference grid which is particularly simple and robust.

DISCLOSURE OF THE INVENTION

The present invention is defined by a method for locating an object by means of a reference grid, the object moving in a plane parallel to or identical to that of the grid, said grid being defined by a plurality of so-called horizontal lines, aligned along a first direction and a plurality of so-called vertical lines, aligned along a second direction distinct from the first one, the vertical lines being separated by a first distance along the first direction and the horizontal lines being separated by a second distance along the second direction. According to this method each time the object crosses a line of the grid, the heading of the object is determined with respect to a reference direction;

as a function of the course thus determined, the probabilities $p(dy_i|\phi_i)$, $p(dx_i|\phi_i)$ of the line thus crossed being respectively a horizontal line and a vertical line of the grid, are obtained when the object moves in the direction given by the heading;

from said probabilities and the first and second distances, the displacement $(\widehat{dx_i}, \widehat{dy_i})$ of the object since the last time it crossed the line of the grid is assessed;

the position of the object is updated from the displacement thus assessed.

In a conventional application, the first and second directions are orthogonal.

If the first direction is selected as said reference direction, the probability $p(dx_i|\phi_i)$ of the crossed line being a vertical line is determined by $$p(dx_i | \varphi_i) = \frac{\tan(\theta)}{\tan(\theta) + |\tan(\varphi_i)|}$$

and the probability $p(dy_i|\phi_i)$ of the crossed line being a horizontal line is determined by $$p(dy_i | \varphi_i) = \frac{|\tan(\varphi_i)|}{\tan(\theta) + |\tan(\varphi_i)|},$$

where $\tan(\theta) = L_y/L_x$, $L_x$ and $L_y$ being respectively the first and second distances and $\phi_i$, being the heading.

The displacement of the object is then assessed by means of $\widehat{dx_i} = \text{sgn}(\cos \phi_i) p(dx_i|\phi_i) L_x$ and $\widehat{dy_i} = \text{sgn}(\sin \phi_i) p(dy_i|\phi_i) L_y$, where $\text{sgn}(\cdot)$ is the signum function and $\phi_i$ is the heading.

The position $(\widehat{x_i}, \widehat{y_i})$ of the object can be updated according to $\widehat{x_i} = \widehat{x_{i-1}} + \widehat{dx_i}$ and $\widehat{y_i} = \widehat{y_{i-1}} + \widehat{dy_i}$ where $(\widehat{x_{i-1}}, \widehat{y_{i-1}})$ is the position of the object obtained the last time the object crossed a line of the grid and $(\widehat{dx_i}, \widehat{dy_i})$ is the displacement assessed since this last time.

Typically, the object is equipped with a first sensor suitable for detecting a line crossing of the grid. This first sensor can be an optical sensor or an accelerometer.

The object can further include course measuring means comprising a second sensor suitable for providing the orientation of the object and a third sensor suitable for giving the direction of its movement.

The second sensor can be a magnetometer or a gyroscope.

The third sensor can be of the same type as the first one and be provided on the object in the proximity of the first sensor, the order of detecting the line crossing by the first and third sensors providing the direction of movement.

The third sensor can be a Doppler sensor.

When the object is equipped with wheels, the third sensor can be suitable for providing the direction of the rotation of said wheels.

In an application of the invention, the object is a supermarket trolley.

DETAILED DISCLOSURE OF PARTICULAR EMBODIMENTS

The problem of locating an object using a reference grid will be considered again.

By location, it is meant herein the determination of the object position and more precisely, the determination of the coordinates of this object in a bidimensional reference frame. This bidimensional reference frame defines the plane wherein the object moves. The plane referred to can be that of the reference grid or a plane parallel thereto. The locating method according to the invention has within its scope the case where the position is determined by the object itself (in the strict sense, the method is then a "positioning" method) and the case where this position is determined by a system external to the object (location method strictly speaking). The term location is herein intended in its general acceptance and covers either case.

The object can be a priori any object, for example an industrial robot, a supermarket trolley or an autonomous vehicle. The reference grid can in this case be provided on the ground or on the ceiling of a building. In another context of application, the object can be a pen, a light pen, an optical mouse or the like. The reference grid is then provided on a support such as a paper sheet or a graphical tablet.

The reference grid can also be made in multiple ways. In the first abovementioned application type, it can result from a pavement on the ground or a pavement of a false-ceiling. In the second application type, it can be obtained by means of a printing onto the support or a display (LCD panel for example).

In any case, the object is provided with a first sensor capable of detecting lines forming the grid. This sensor can be an optical one, in which case the detection of the line crossing is obtained for example by means of a grey level or colour change in the centre of the image. Alternatively, this sensor can be an accelerometer or a shock sensor when the lines of the grid are formed in a relief or hollow manner (case of a pavement on the ground or a pattern on a support), the line being detected by means of the vibration generated when the object crosses it. This sensor can also be an inductive one when the grid consists of an array of conductors buried or present in the ground. It will be generally understood that the type of sensor will be a function of the type of reference grid being used.

The reference grid consists of a set of so-called horizontal lines, aligned along a first direction and a second set of so-called vertical lines, aligned along a second direction, distinct from the first one. The vertical lines are spaced apart by a distance $L_x$ along the first direction and the horizontal lines are spaced by a distance $L_y$ along the second direction. The first and second directions are preferably orthogonal. In the following, the reference frame $(O, u_x, u_y)$ will be considered where the origin $O$ is located in the plane where the object moves and $u_x$, $u_y$ are the unit vectors respectively directed in the first and second directions.

The object is further equipped with heading measuring means enabling the direction of movement of the object to be determined in the reference frame in question. These means can comprise a second sensor capable of determining the orientation of the object as well as a third sensor giving the direction of its movement. It should be noted that this third sensor is optional if the object can only move in a single direction (forward direction only for example).

The second sensor can consist of a magnetometer (giving the orientation of the object with respect to the terrestrial magnetic field or an artificial magnetic field), a gyroscope, a camera suitable for detecting visual marks in a building, an array of antennas suitable for detecting the angle of arrival of a signal emitted by a beacon, etc.

The third sensor can be made for example by a wheel rotation sensor when the object is equipped therewith, a Doppler sensor or even an accelerometer. Advantageously, the third sensor will be identical to the first one and located in the proximity thereof, the direction of movement being then determined by the order wherein the line crossing is detected by the first and third sensors.

The second and third sensors can be multiple ones and their respective outputs averaged so as to improve the signal to noise ratio of the heading measurement.

Other embodiments of the heading measuring means could be contemplated by those skilled in the art without departing from the scope of the present invention.

The locating method according to the invention is based on a probabilistic approach of line crossings of the reference grid, from a previous knowledge of the direction of movement of the object.

The originality of this method lies in not trying to find, at each line crossing, whether the crossed line is horizontal or vertical (deterministic approach) but in taking advantage of the great number of line crossed by a segment of the object trajectory.

More precisely, if it is assumed that the $i^{th}$ line crossing has just been detected and if $p(dx_i|\phi_i)$, resp. $p(dy_i|\phi_i)$, represents the conditional probability that the crossed line is vertical, resp. horizontal, given that the direction of movement is at an angle $\phi_i$ with the axis Ox (that is with the first direction), there are the following relationships:

$$p(dx_i|\varphi_i) + p(dy_i|\varphi_i) = 1 \qquad (2)$$

$$\frac{p(dy_i|\varphi_i)}{p(dx_i|\varphi_i)} = \frac{\lambda_x(\varphi_i)}{\lambda_y(\varphi_i)}$$

where $\lambda_x(\phi_i)$, $\lambda_y(\phi_i)$ are respectively the densities of the horizontal and vertical lines when the object moves in the direction of movement. The axis of movement is noted $\Delta(\phi_i)$.

When the vertical and horizontal lines are orthogonal, it can be shown that the ratio of densities can be simply expressed as:

$$\frac{\lambda_x(\varphi_i)}{\lambda_y(\varphi_i)} = \frac{\tan(\varphi_i)/L_y}{1/L_x} = \frac{L_x \tan(\varphi_i)}{L_y} = \frac{\tan(\varphi_i)}{\tan(\theta)} \qquad (3)$$

with $\tan(\theta) = \frac{L_y}{L_x}$.

The expression (3) is intuitively understood since if the object moves along the axis $\Delta(\phi_i)$ of $(\Delta_x, \Delta_x \tan(\phi_i))$ in the reference frame (O, $u_x$, $u_y$), the average number of vertical lines crossed during this movement will be $\Delta_x/L_x$ whereas the average number of horizontal lines crossed during the same movement will be $\Delta_x \tan(\phi_i)/L_y$.

If it is assumed that $0 \leq \phi_i < \pi/2$, the movement between two line crossings can be assessed by:

$$\widehat{dx}_i = p(dx_i|\phi_i)L_x$$

$$\widehat{dy}_i = p(dy_i|\phi_i)L_y \qquad (4)$$

that is, taking account of (2) and (3):

$$\hat{dx}_i = \frac{\tan(\theta)}{\tan(\theta) + \tan(\varphi_i)} L_x = \frac{L_y}{L_y + L_x \tan(\varphi_i)} L_x \qquad (5)$$

$$\hat{dy}_i = \frac{\tan(\varphi_i)}{\tan(\theta) + \tan(\varphi_i)} L_y = \frac{L_x \tan(\varphi_i)}{L_y + L_x \tan(\varphi_i)} L_y$$

If the functions $f_x$ and $f_y$ are respectively defined by:

$$f_x(\varphi_i) = p(dx_i|\varphi_i) = \frac{\tan(\theta)}{\tan(\theta) + |\tan(\varphi_i)|} \qquad (6)$$

$$f_y(\varphi_i) = p(dy_i|\varphi_i) = \frac{|\tan(\varphi_i)|}{\tan(\theta) + |\tan(\varphi_i)|} \qquad (7)$$

the displacement ($\widehat{dx}_i$, $\widehat{dy}_i$) of the object is assessed for the different ranges of $\phi_i$ as follows:

$0 \leq \phi_i < \pi/2$ $$\widehat{dx}_i = f_x(\phi_i)L_x; \quad \widehat{dy}_i = f_y(\phi_i)L_y \qquad (8)$$

$\pi/2 \leq \phi_i < \pi$ $$\widehat{dx}_i = -f_x(\phi_i)L_x; \quad \widehat{dy}_i = f_y(\phi_i)L_y \qquad (9)$$

$-\pi \leq \phi_i < -\pi/2$ $$\widehat{dx}_i = -f_x(\phi_i)L_x; \quad \widehat{dy}_i = -f_y(\phi_i)L_y \qquad (10)$$

$-\pi/2 \leq \phi_i < 0$ $$\widehat{dx}_i = f_x(\phi_i)L_x; \quad \widehat{dy}_i = -f_y(\phi_i)L_y \qquad (11)$$

In any case, it will be noted that the displacement of the object is given by $\widehat{dx}_i = \text{sgn}(\cos \phi_i) f_x(\phi_i) L_x$ and $\widehat{dy}_i = \text{sgn}(\sin \phi_i) f_y(\phi_i) L_y$, where $\text{sgn}(\cdot)$ is the signum function (equal to $-1$ for a negative number and equal to $+1$ for a positive number).

The position ($\hat{x}_i$, $\hat{y}_i$) of the object in the reference frame (O, $u_x$, $u_y$) upon detecting the $i^{th}$ crossing is then assessed by means of:

$$\hat{x}_i = \hat{x}_{i-1} + \widehat{dx}_i$$

$$\hat{y}_i = \hat{y}_{i-1} + \widehat{dy}_i \qquad (12)$$

where ($\hat{x}_{i-1}$, $\hat{y}_{i-1}$) was the position of the object assessed during the previous crossing.

Figure 2:
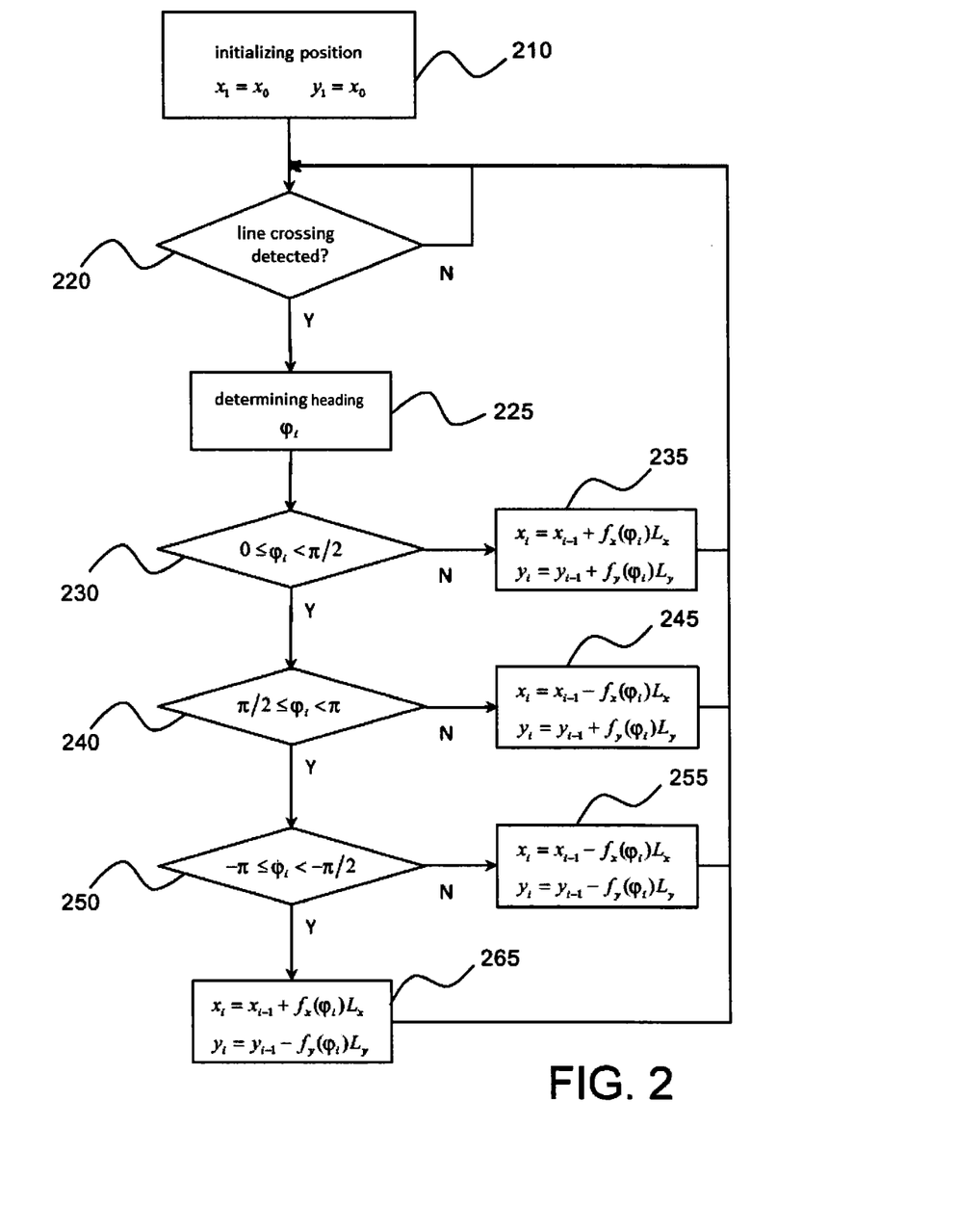
FIG. 2 represents the flow diagram of the locating method according to one embodiment of the present invention.

FIG. 2 represents the flow diagram of the locating method according to one embodiment of the invention.

The reference grid is defined by the vectors $u_x$ and $u_y$ respectively giving the first and second directions, as well as the distances $L_x$ and $L_y$, in the meaning defined above. The distances $L_x$ and $L_y$ are assumed to be known.

In step 210, the position of the object is initialized by $\hat{x}_i = x_0$, $\hat{y}_i = y_0$. In practice, this initializing step could be triggered when the object passes at a predetermined point of a known position (for example the entrance of a building). The previous passing of the object through this point could incidentally condition the implementation of the locating method.

When a line crossing is detected using the first sensor, in 220, it is determined in 225 the direction of movement of the object using heading measuring means. This direction is conventionally defined by the angle $\phi_i$ with the first direction.

Then, it is determined in which angular range the direction of movement is.

If, in 230, the angle $\phi_i$ is such that $0 \leq \phi_i < \pi/2$, in other words if the object moves in the positive x direction and that of positive y, the object position is updated in 235 by means of the expressions (8) and (12), that is:

$$\hat{x}_i = \hat{x}_{i-1} + f_x(\phi_i)L_x$$

$$\hat{y}_i = \hat{y}_{i-1} + f_y(\phi_i)L_y \qquad (13)$$

If not, the method proceeds to 240.

If in 240, the angle $\phi_i$ is such that $\pi/2 \leq \phi_i < \pi$, in other words, if the object moves in the negative x direction and that of positive y, the position of the object is updated in 245 by means of the expressions (9) and (12), that is:

$$\widehat{x}_i = \widehat{x}_{i-1} - f_x(\phi_i)L_x$$

$$\widehat{y}_i = \widehat{x}_i + f_y(\phi_i)L_y \qquad (14)$$

If not, the method proceeds to 250.

If in 250, the angle $\phi_i$ is such that $-\pi \le \phi_i < -\pi/2$, in other words, if the object moves in the negative x direction and that of negative y, the position of the object is updated in 255 by means of the expressions (10) and (12), that is:

$$\widehat{x}_i = \widehat{x}_{i-1} - f_x(\phi_i)L_x$$

$$\widehat{y}_i = \widehat{y}_{i-1} - f_y(\phi_i)L_y \qquad (15)$$

If not, the angle $\phi_i$ is such that $-\pi/2 \le \phi_i < 0$, that is the object moves in the negative x direction and that of negative y, the position of the object is updated in 265 by means of the expressions (10) and (12), that is:

$$\widehat{x}_i = \widehat{x}_{i-1} + f_x(\phi_i)L_x$$

$$\widehat{y}_i = \widehat{y}_{i-1} - f_y(\phi_i)L_y \qquad (16)$$

Then we go back to the step of crossing detection in 220.

The values $f_x(\phi_i)$, $f_y(\phi_i)$ or, possibly, the values $f_x(\phi_i)L_x$ $f_y(\phi_i)L_y$, can be stored in a table and read as a function of the heading $\phi_i$. Alternatively, these values can be calculated at each line crossing.

The locating method can further include calibration phases at regular intervals or when the object passes through a known position.

The position calculation can be performed by a processor equipping the object or remotely by a system external to the object. In the latter case, the line crossing information as well as the course $\phi_i$ are transmitted by the object to the system in question.

Figure 3A:
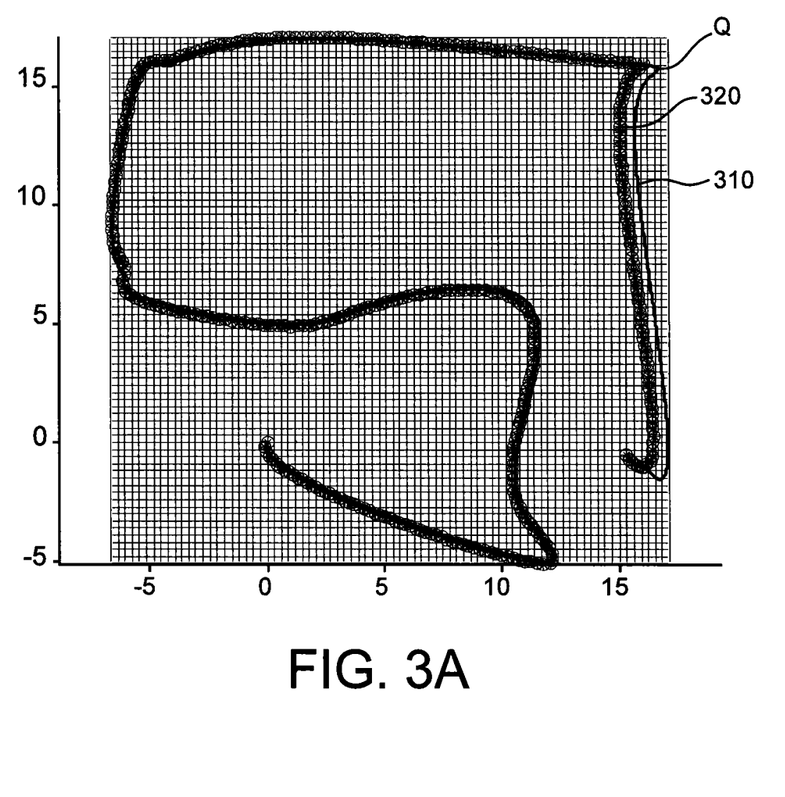
FIG. 3A represents the trajectory of an object which is obtained thanks to the locating method according to the embodiment of FIG. 2, in the absence of angular noise and wrong crossing detection.

FIG. 3A represents in dash line the actual trajectory, 310, of an object moving with respect to a reference grid. The trajectory assessed by means of the previously described locating method is represented in solid line, 320. It has been assumed here that the course measured was the actual course of the object and that the line crossing detection was not affected by errors.

It is noticed that the assessed trajectory is very close to the actual trajectory. Even in the case of a quick turn of the object (cusp Q), the locating method enables a good approximation of the actual trajectory to be achieved, without the occurrence of a disastrous error.

Figure 3B:
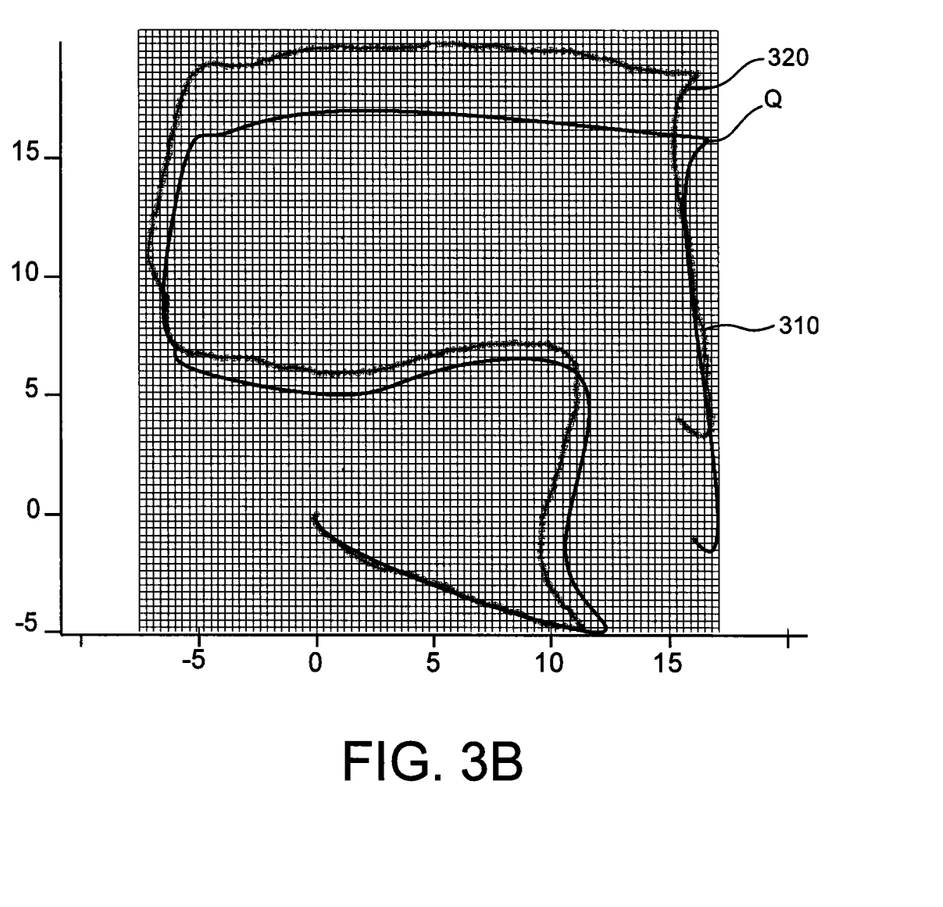
FIG. 3B represents the trajectory of the object by means of the same locating method but under deteriorated conditions.

FIG. 3B represents the trajectory assessed by the same locating method but under deteriorated conditions. More precisely, it has been assumed here that the heading measurement was affected by an angular noise with a standard deviation of 10° and that the line crossing detection operated with a false alarm rate of 14% and a non-detection rate of 10%. By false alarm, it is meant that a line crossing is detected whereas it is not present and by non-detection, it is meant that a line crossing by the object is not detected.

It is noticed that despite the deteriorated operating conditions, the locating method provides an acceptable assessment of the actual trajectory. It is consequently robust and does not lead to disastrous errors.

The invention claimed is:

1. A method for locating an object by a reference grid, the object moving in a plane parallel to or identical to that of the grid, the grid being defined by a plurality of horizontal lines aligned along a first direction and a plurality of vertical lines aligned along a second direction distinct from the first direction, the vertical lines being separated by a first distance, $L_x$, along the first direction and the horizontal lines being separated by a second distance, $L_y$, along the second direction, the method comprising, each time the object crosses at least one line of the grid:

determining a heading, $\phi_i$, of the object with respect to a reference direction;

obtaining, as a function of the determined heading, probabilities $p(dy_i|\phi_i)$, $p(dx_i|\phi_i)$, of the at least one line of the grid crossed by the object being respectively a horizontal line of the grid and a vertical line of the grid, when the object moves in the heading direction, $\phi_i$, where $dy_i$ is a displacement of the object in the second direction, and $dx_i$ is a displacement of the object in the first direction;

assessing, from the probabilities $p(dy_i|\phi_i)$, $p(dx_i|\phi_i)$, the first distance, $L_x$, and the second distance, $L_y$, a displacement, $(\widehat{dx}_i, \widehat{dy}_i)$, of the object since a most recent time the object crossed the at least one line of the grid; and updating a position, $(\hat{x}_i, \hat{y}_i)$, of the object in the reference grid from the assessed displacement, $(\widehat{dx}_i, \widehat{dy}_i)$.

2. The locating method according to claim 1, wherein the first and second directions are orthogonal.

3. The locating method according to claim 1, wherein when the first direction is selected as the reference direction, the probability $p(dx_i|\phi_i)$ of the at least one crossed line being a vertical line is determined by $$p(dx_l|\varphi_l) = \frac{\tan(\theta)}{\tan(\theta) + |\tan(\varphi_i)|},$$

and the probability $p(dy_i|\phi_i)$ of the crossed line being a horizontal line is determined by $$p(dy_l|\varphi_l) = \frac{\tan(\varphi_i)}{\tan(\theta) + |\tan(\varphi_i)|},$$

where $\tan(\theta) = L_y/L_x$.

4. The locating method according to claim 2, wherein, the first direction being selected as the reference direction, the displacement of the object is assessed by $\widehat{dx}_i = \text{sgn}(\cos \phi_i) p(dx_i|\phi_i)L_x$ and $\widehat{dy}_i = \text{sgn}(\sin \phi_i) p(dy_i|\phi_i)L_y$, where $\text{sgn}(\cdot)$ is the signum function.

5. The locating method according to claim 4, wherein the position, $(\hat{x}_i, \hat{y}_i)$, of the object is updated according to $\hat{x}_i = \widehat{x}_{i-1} + \widehat{dx}_i$ and $\hat{y}_i = \widehat{y}_{i-1} + \widehat{dy}_i$, where $(\widehat{x}_{i-1}, \widehat{y}_{i-1})$ is the position of the object obtained the last time the object crossed a line of the grid and $(\widehat{dx}_i, \widehat{dy}_i)$ is the displacement assessed since the last time.

6. The locating method according to claim 1, wherein the object includes a first sensor configured for detecting a line crossing of the grid.

7. The locating method according to claim 6, wherein the first sensor is an optical sensor.

8. The locating method according to claim 6, wherein the first sensor is an accelerometer.

9. The locating method according to claim 6, wherein the object includes heading measuring means comprising a second sensor configured to provide orientation of the object and a third sensor configured to give a direction of its movement.

10. The locating method according to claim 9, wherein the second sensor is a magnetometer.

11. The locating method according to claim 10, wherein the second sensor is a gyroscope.

12. The locating method according to claim 9, wherein the third sensor is of same type as the first sensor and is provided on the object in proximity of the first sensor, an order of detecting the line crossing by the first and third sensors providing the direction of movement.

13. The locating method according to claim 9, wherein the third sensor is a Doppler sensor.

14. The locating method according to claim 9, wherein the object includes wheels and the third sensor provides a direction of rotation of the wheels.

15. The locating method according to claim 1, wherein the object is a supermarket trolley.

\* \* \* \* \*